United States Patent [19]

Motonami et al.

[11] Patent Number: 4,557,523
[45] Date of Patent: Dec. 10, 1985

[54] AUTOMATIC SEAT BELT DEVICE

[75] Inventors: Masanao Motonami; Makoto Yamada; Hisashi Ogawa, all of Toyota, Japan

[73] Assignee: Toyota Jidosha Kabushiki Kaisha, Aichi, Japan

[21] Appl. No.: 508,157

[22] Filed: Jun. 27, 1983

[30] Foreign Application Priority Data

Feb. 21, 1983 [JP] Japan ............................ 58-24053[U]

[51] Int. Cl.⁴ ............................................ A62B 35/00
[52] U.S. Cl. ...................................... 297/468; 280/808
[58] Field of Search ....................... 297/468, 483, 473; 280/801, 808

[56] References Cited

U.S. PATENT DOCUMENTS

| 3,521,901 | 7/1970 | Wackym | 297/483 |
| 3,586,373 | 6/1971 | Reidelbach | 297/483 |
| 3,912,329 | 10/1975 | Connors et al. | 297/483 |
| 3,929,351 | 12/1975 | Fricko | 297/483 X |
| 4,101,171 | 7/1978 | Sasaki et al. | 297/483 |
| 4,216,978 | 8/1980 | Mauron | 280/808 X |
| 4,312,539 | 1/1982 | Takada | 297/468 |
| 4,372,580 | 2/1983 | Motonami et al. | 280/808 X |
| 4,396,228 | 8/1983 | Go | 297/468 X |

FOREIGN PATENT DOCUMENTS 1490519 11/1977 United Kingdom ................ 297/483

*Primary Examiner*—Philip C. Kannan
*Attorney, Agent, or Firm*—Parkhurst & Oliff

[57] ABSTRACT

An automatic seat belt device has a seat belt guide ring pivotally secured to the bent of a stationary guide having an L-shaped section bent parallel to the lateral direction of the vehicle, the guide being mounted to the lateral side of a seat cushion. The seat belt guide ring is formed substantially in triangular shape and formed with a long guiding hole for inner seat belt along one side thereof. The guide ring is pivotal in the lateral direction. Twisting of the seat belt at the guide ring thereby can be prevented, and slack in the guide ring can be removed in case of upward or downward longitudinal slack of the belt by the clockwise or counterclockwise rotation of the guide ring.

7 Claims, 5 Drawing Figures

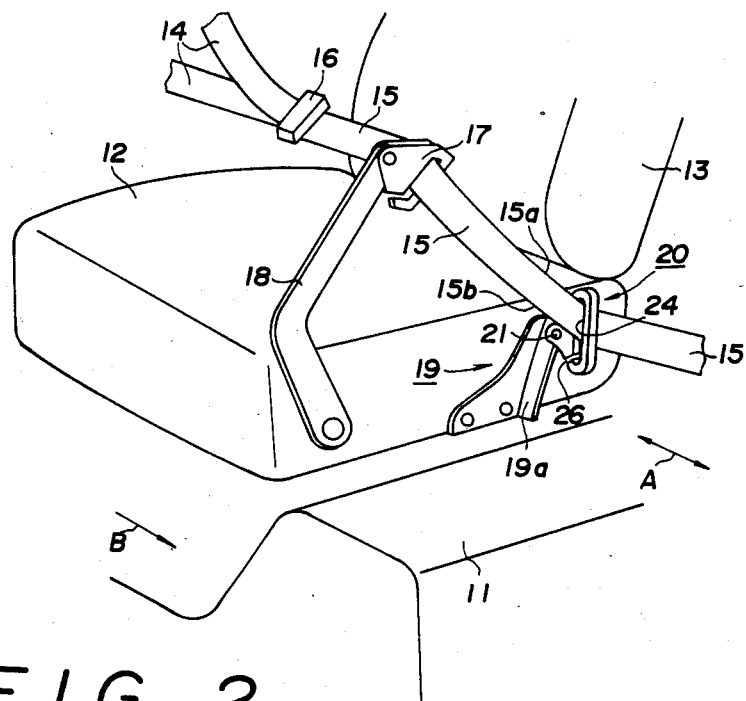
FIG. 1
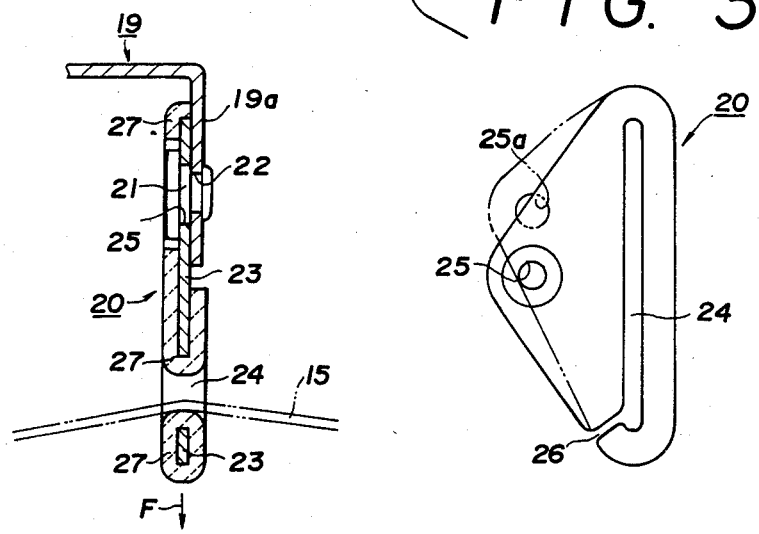
FIG. 2
FIG. 3

AUTOMATIC SEAT BELT DEVICE

BACKGROUND OF THE INVENTION

This invention relates to an automatic seat belt device and, more particularly, to a stationary guide for a seat belt of an automatic seat belt device.

A conventional automatic seat belt with a belt guide which rotates longitudinally of a vehicle when an occupant gets in or out of the vehicle is already known in which stationary guides for the seat belt are laterally provided at both right and left sides of a front seat cushion. More particularly, a stationary guide 3 for a seat belt 2 is provided, as shown in FIG. 4, at the side of a front seat cushion between a belt guide 1 which rotates longitudinally of the vehicle and an emergency locking type rewinder (ELR), thereby preventing an inner seat belt 2a from movng upwardly. Thus, the restriction of an occupant is smoothened. However, since the position and the inclination of the guiding section of the guide 3 are constant, an irregularly displaced part is produced at the belt 2a, thereby causing a difficulty in the operation of the belt.

Another automatic seat belt device has been proposed to eliminate the above drawbacks, as shown in FIG. 5, in which a stationary guide body 5 is mounted on the side surface of a front seat cushion 4, and a guide ring 7 having a long guiding hole 6 for an inner belt 2a is pivotally secured at the end of the body 5 to rotate through a predetermined angle longitudinally of the vehicle, so that the guide section is movable, thereby preventing the occurrence of the irregularly displaced part of the belt 2a at the stationary guide.

According to the structure of this seat belt device, the displacement of the belt 2a can be slightly prevented, but, as evident from FIG. 5, the long hole 6 still is inclined longitudinally of the vehicle due to the rotation of the ring 7. Accordingly, a twist still is produced at the belt 2a. Thus, the belt does not slide smoothly, as was the case with the stationary guide 3, so that if a high load is applied to a drive motor, a door can be hard to open or the ELR may not sufficiently rewind, with the result that the stationary guide of the belt does not smoothly operate.

SUMMARY OF THE INVENTION

Therefore, an object of this invention is to provide an automatic seat belt device which is capable of preventing twisting of the stationary guide for a seat belt thereof.

Another object of this invention is to provide an automatic seat belt device which can smoothly rotate a guide ring by reducing the moment applied to the rotational shaft of the guide ring.

Still another object of this invention is to provide an automatic seat belt device which can simply remove a slack of the guide ring in case of upward or downward longitudinal slack of the belt by the clockwise or counterclockwise rotation of the guide ring.

In order to achieve the above and other objects and features of the present invention, there is provided an automatic seat belt device in which a seat belt is inserted into a stationary guide for the seat belt, which is secured to the lateral side of a front seat cushion, and a guide ring to be guided is laterally secured.

BRIEF DESCRIPTION OF THE DRAWINGS

The above and other objects and features of the invention will be apparent from a reading of the following descriptin of the disclosure found in the accompanying drawings and novelty thereof pointed out in the appended claims.

FIG. 1 is a perspective view showing an example of a stationary guide of a seat belt in a preferred embodiment of an automatic seat belt device according to the present invention;

FIG. 2 is an enlarged sectional plan view of the essential part of the device;

FIG. 3 is a front view of a guide ring of the device; and

DESCRIPTION OF THE PREFERRED EMBODIMENTS

Figure 4:
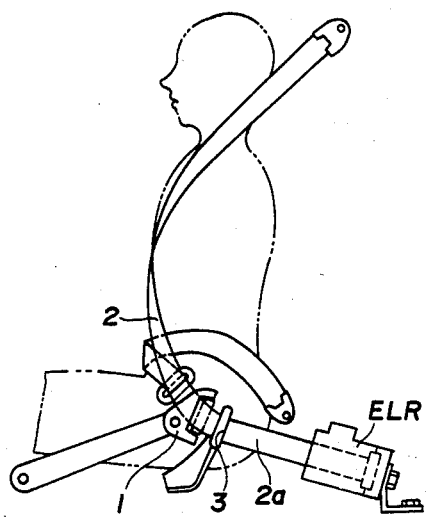
FIGS. 4 and 5 are side views showing the stationary guide of a seat belt in a conventional automatic seat belt device.
Figure 5:
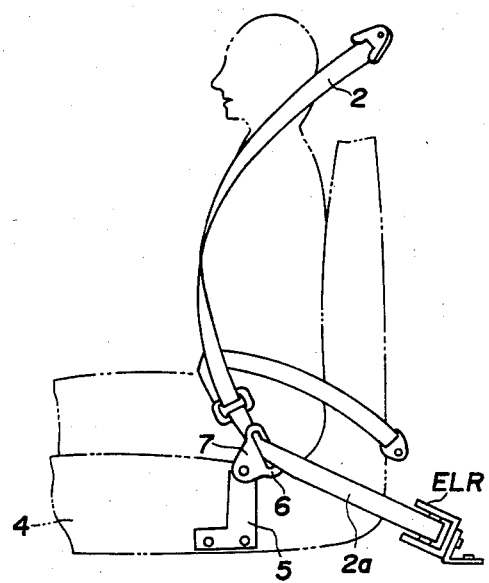

An embodiment of the present invention will now be described in more detail with reference to the accompanying drawings.

FIG. 1 shows a perspective view of an example of a stationary guide for a seat belt in an automatic seat belt device according to the present invention. In FIG. 1, reference numeral 11 designates an automotive floor, 12 a front seat cushion, 13 a seat back, 14 an outer seat belt, 15 an inner seat belt, 16 a through ring, 17 a rotary guide, 18 a rotary guide arm, and 19 a stationary guide (which is fixed to the lateral side of the cushion 12) for the inner seat belt 15. An arrow A designates a lateral direction of a vehicle, and an arrow B an inner side of the vehicle.

In this invention, the belt 15 is inserted into the guide ring 20 for the belt 15, which is pivotally secured to a guide 19 for rotation in the lateral direction of the vehicle.

The guide 19 is, as shown in FIGS. 1 and 2, formed of an inverted L-shaped plate bent at one elevational side at a right angle, and has a mounting hole 22 for a rotational shaft 21 of the ring 20, as shown in FIG. 2, at the top of the vertical wall 19a of the guide 19.

On the other hand, the ring 20 is, as shown in FIGS. 2 and 3, formed of a plate 23 provided with long guiding hole 24 for the belt 15 along a side thereof. The plate 23 is triangular in shape with rounded corners. An engaging hole 25 to be engaged with the shaft 21 is formed at the other side of the plate 23, and an inserting slit 26 for the belt 15 is formed at the bottom of the hole 24. The entire surface except for the pivoting section is covered with molding resin 27, and the shaft 21 inserted into the hole 25 is rotatably engaged with the hole 22 of the guide 19.

In the above described structure, the position of the hole 25 of the ring 20 to be engaged with the shaft 21 may be displaced with respect to the ring 20 as shown by the engaging hole 25a designated by a chain line in FIG. 3. Further, the slit 26 for the belt 15 may not always be provided.

When the ring 20 of the guide 19 is so mounted for rotation laterally of the vehicle, the resultant force direction of the tension of the belt 15 inserted into the hole 24 of the ring 20 (in the direction designated by an arrow F in FIG. 2) approaches a right angle to the center line of the shaft 21 of the ring 20. Accordingly, the resistance of the ring 20 to rotation becomes low, and the slack of the belt 15 at the guide ring 20 can be removed at both side ends and hence at the upper end 15a or lower end 15b of the belt 15. Consequently, twisting of the belt 15 at the guide 19 can be prevented, thereby allowing smooth extending or rewinding of the belt 15.

The foregoing description relates to the case of a front 3-point ELR type seat belt. However, the present invention is not limited only to this. For example, this invention can be applied to a 2-point type ELR seat belt system. Further, the guide 17 may not always be provided at the inner side of the seat.

In the embodiment shown in FIG. 1, the shaft 21 of the ring 20 of the guide 19 is provided to be disposed between the belt 15 and the cushion 12. However, the shaft 21 may also be provided at the inner side of the vehicle from the belt 15.

According to the present invention thus constructed as described above, the irregular displacement and twisting of the belt at the stationary guide of the seat belt, causing irregular operation of the automatic seat belt device can be simply eliminated, thereby allowing smooth and rapid operation of the belt in the automatic seat belt device.

What is claimed is:

1. A seat belt guide comprising:
   a bracket mounted to a side surface of a seat and having a portion extending substantially laterally of the seat; and
   a seat belt guide ring pivotably secured to said laterally extending portion of said bracket for rotation in a plane substantially lateral to said seat, and having a slot formed therein for guiding a seat belt.

2. The seat belt guide of claim 1, wherein said bracket has a first substantially planar part attached to said seat, and a second substantially planar part formed substantially perpendicularly to said first part, said second part comprising said laterally extending portion of said bracket.

3. The seat belt guide of claim 1, wherein said guide ring comprises a substantially planar plate having a triangular shape with rounded corners, said slot being formed adjacent one side of said triangular shape, and having an engaging hole formed adjacent a vertex of the triangular shape opposite said one side, said guide ring being pivotably secured to said bracket by a pin through said engaging hole.

4. The seat belt guide of claim 3, wherein said guide ring further comprises molding resin covering all portions of said triangular shape except for portions adjacent to and in said engaging hole.

5. The seat belt guide of claim 3, wherein said guide ring further comprises a slit connecting said slot to an outside edge of said triangular shape such that a seat belt may be inserted into said slot through said slit.

6. The seat belt guide of claim 3, wherein said triangular shape is substantially an isoceles triangle, the slot being formed at the base thereof.

7. A seat belt guide device comprising:
   a seat;
   a substantially L-shaped bracket mounted to said seat on one side of said L, another side of said L extending substantially laterally outwardly from said seat;
   a substantially planar triangular guide ring pivotally mounted to said laterally extending portion of said bracket for rotation in a plane substantially lateral to said seat, said guide ring being mounted to said laterally extended portion by a pin extending through said laterally extending portion and extending substantially perpendicularly to the plane of the guide ring at a vertex of the guide ring, said guide ring further comprising a slot for guiding a seat belt, said slot being formed adjacent an edge of said guide ring opposite said vertex, and having a slit connecting said slot to an outer edge of said guide ring such that said seat belt may be inserted into said slot through said slit, the entire surface of said guide ring except for the portions adjacent to said pin being covered with molding resin.

* * * * *